United States Patent
Lim et al.

(10) Patent No.: US 7,730,098 B2
(45) Date of Patent: Jun. 1, 2010

(54) METHOD FOR SUPPORTING ONTOLOGY-RELATED SEMANTIC QUERIES IN DBMSS WITH XML SUPPORT

(75) Inventors: Lipyeow Lim, Hawthorne, NY (US); Haixun Wang, Irvington, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 11/681,319

(22) Filed: Mar. 2, 2007

(65) Prior Publication Data

US 2008/0215542 A1    Sep. 4, 2008

(51) Int. Cl.
*G06F 17/30* (2006.01)

(52) U.S. Cl. ...................................... 707/793

(58) Field of Classification Search .......... 707/999.001, 707/999.003, 999.1, 999.101, 999.105, 999.2
See application file for complete search history.

(56) References Cited

U.S. PATENT DOCUMENTS

| | | | |
|---|---|---|---|
| 2002/0120618 | A1 | 8/2002 | Ushijima et al. |
| 2003/0101170 | A1 | 5/2003 | Edelstein et al. |
| 2004/0243595 | A1 | 12/2004 | Cui et al. |
| 2005/0149484 | A1 | 7/2005 | Fox et al. |
| 2006/0036633 | A1* | 2/2006 | Chong et al. ................. 707/101 |

OTHER PUBLICATIONS

Fuhr et al., Classification and Intelligent Search on Information in XML, 2001, IEEE, pp. 1-8.*
Zaijun Hu, An Ontology Model for the XML-based Knowledge-enriched Integration Server, 2002, DBLP:conf/isdb/2002, pp. 43-48.*
Das, S., et al, "Supporting Onbtology-based Semantic Matching in RDBMS", Proceedings of the 30th VLDB Conference, pp. 1054-1065.

* cited by examiner

*Primary Examiner*—Fred I Ehichioya
(74) *Attorney, Agent, or Firm*—Whitham, Curtis, Christofferson & Cook, P.C.; Kenneth R. Corsello

(57) ABSTRACT

A method for supporting semantic matching queries in a database management system (DBMS) by extracting and storing the transitive/subsumption relationships from a given ontology data in a DBMS with native XML support. These transitive relationships are transformed into a set of XML documents that are natural mappings of the hierarchical structure of the transitive relationships. A table function construct expresses semantic matching queries in a declarative manner. The semantic matching queried are automatically rewritten or translated into standard SQL/XML search operators such as XQuery, XPath and XMLExists, and executed by the SQL/XML DBMS on the given instance data and the extracted transitive relationships data.

14 Claims, 8 Drawing Sheets

Figure 2

| ID | Name | CEO | Employees | ... |
|----|------|-----------|---------|---|
| 1 | IBM | Palmisano | 300,000 | |
| 2 | DELL | Dell | 53,000 | |
| 3 | C | Tom | xx | |
| 4 | D | Bob | xx | |
| 5 | E | Mark | xx | |
| 6 | F | David | xx | |
| 7 | G | Andres | xx | |

(a) Company

| ID | Business |
|----|----------|
| 1 | software |
| 2 | retail |
| 3 | wireless |
| 4 | manufacturing |

(b) HasBusiness

| ID | Location |
|----|----------|
| 1 | Armonk |
| 2 | Round Rock |
| 3 | Munich |
| 4 | Beijing |

(c) HasBranch

Figure 6

610:
```
SELECT C.Name
FROM
    HasBranch AS L,
    Ontology AS O,
    Company AS C
WHERE
    O.Term=L.Location
    AND C.ID=L.ID;
```
- 610A: Ontology(O, 'subregion', 'Europe') AS O
- 610B: 'subregion'
- 610C: 'Europe'
- 610D: L.Location

620:
```
SELECT C.Name
FROM
    HasBranch AS L,
    Ontology AS O,
    Company AS C
WHERE XMLEXISTS(
    '$t//Europe//*[fn:string(node-name(.))=$r]'
    PASSING BY REF O.tree AS "t", B.location AS "r")
    AND O.OID=0
    AND O.relation='subregion'
    AND C.ID=L.ID;
```
- 620A: O.OID=0
- 620B: 'subregion'
- 620C: C.Name
- 620D: B.location AS "r"

METHOD FOR SUPPORTING ONTOLOGY-RELATED SEMANTIC QUERIES IN DBMSS WITH XML SUPPORT

BACKGROUND OF THE INVENTION

1. Field of the Invention

The present application generally relates to data and query processing and, more particularly, to a method for supporting semantic matching queries in a database management system (DBMS) that stores the transitive relationships of an ontology in the DBMS, expresses semantic matching queries on the transitive relationship and instance data, and processes the semantic matching queries.

2. Background Description

Database management systems (DBMSs) have been used with great success in managing and manipulating huge amounts of structured data; however, there is a substantial gap between manipulating the semantic or domain knowledge that describes the data stored in a DBMS and the data itself.

For example, assume a given database of, for example, various companies and, for each, the locations of their branches and specific names for their fields of business. A "semantic query" means a query that cannot be answered using the information contained in that database alone, without a further domain of knowledge. As an illustrative example, a user may wish to search companies that have branches in countries having a per-capita income of under X dollars. Assuming that the example database of companies, their branch locations and fields of business does not have information as to the per-capita income of countries, the user could not successfully search the database for the desired information. There may be a further domain that may known to the user, but it is a separate database.

A particular example of where such information may exist is an "ontology," which is an explicit specification of a conceptualization of a universe, or domain. Ontologies are known in various information fields and endeavors in the context of semantic web. The use of ontologies and ontology languages, such as the OWL Web Ontology Language, has attracted attention in the data processing arts. For many database applications, ontologies appear to be the best way to represent the domain knowledge of the data instances stored in the database. There is a very substantial problem, though, due to the information in the ontology, e.g., the per capita income of countries, being in separate form than the given XML database, such as the example identified above having the names, locations of branches, and specific fields of business in which each company operates.

Various systems have been developed for building and manipulating ontologies. For example, the Protégé ontology editor is a knowledge-based editor that allows the user to construct a domain ontology, customize data entry forms, and enter data. RStar is a resource description framework (RDF) storage and query system for enterprise resource management. Other ontology building systems include OntoEdit, OntoBorker, OntologyBuilder and OntologyServer and KAON (the KArlsruhe ONtology and semantic web tool suite) ontology management infrastructure. Systems often use a file system to store the ontology (e.g., OntoEdit). Others (e.g., RStar and KOAN) allow storing ontology using a relational database management system (RDBMS). However, queries on an ontology in these systems are typically processed by some middleware (wrapper) built on top of the DBMS engine. The two main disadvantages of this loosely-coupled approach are (1) ontology data cannot be accessed inside the DBMS directly and (2) the query processing and optimization power of DBMSs are lost when manipulating ontology data.

One approach to ontology management proposed in the database arts is a tightly-coupled solution by Oracle, as described by S. Das, E. I. Chong, G. Eadon, and J. Srinivasan in "Supporting Ontology-based Semantic Matching in RDBMS", VLDB 2004, pp. 1054-1065 ("the S Das et al. approach"). The S. Das et al. approach proposes a method to support ontology-based semantic matching in RDBMS using a structured query language (SQL) directly. In this approach, ontology data are pre-processed and stored in a set of system-defined tables. A set of special operators is introduced to query/access the ontology and a new index schema is introduced to optimize query processing. A database user can thus reference the ontology data directly using the new operators. The S. Das et al. approach may be viewed as "tightly coupled" and, compared to the approaches typically characterized as "loosely-coupled" approaches, it may be viewed as providing some possibility of combining ontology query operators with existing SQL operators (such as joins with other data stored in relational tables).

The present inventors have identified, though, that there is an inherent "mismatch" between the relational schema employed by SQL and the hierarchical model of ontology data. The present inventors have also identified that, because of this mismatch, the S. Das et al. relational-model approach likely has inherent, substantial shortcomings in query processing efficiency.

For example, inferencing is one of the most fundamental and also most computationally expensive operations on ontology data. Previous approaches, including the S. Das et al. approach, typically require precomputing and materializing a significant quantity of inferencing results (i.e., transitive closures) to achieve reasonable performance at query time. These in turn impose processing burdens.

Stated more specifically, materializing inferencing results involves explicitly computing and storing information that can be derived from the ontology and database tables using logical inferencing. Further, transitive closure for a collection of instances of a relation R is the collection of all possible instances of the relation R that can be derived by applying the transitivity rule. This leads to significant expense and overhead in terms of time and storage at the preprocessing step. More significantly, with these approaches, updates of ontology data may be practically impossible once they are preprocessed.

Accordingly, the present inventors have identified a need for processing semantic queries on a combined resource of an XML database and an ontology having additional information pertaining to elements stored in the XML database but which is not in a native XML system.

SUMMARY OF THE INVENTION

To provide this and other solutions, and to provide additional features, the inventors have developed a method and system providing for semantic queries on a combined resource of a given XML database and a given ontology not originally providing native XML support.

One embodiment of the invention extracts information from the given ontology and stores it in a table related to the tables in the XML database, such that the given XML database and extracted information from the given ontology are under a common Structured Query Language/XML (SQL/XML) DBMS with native XML support. One aspect of the embodiment is that the common SQL/XML DBMS storing the SQL/XML database and the extracted ontology information provides for semantic queries on the database information together with the extracted ontology information. Another aspect stores the given SQL/XML database and the extracted ontology information under a common DBMS with native XML support, thereby providing for semantic queries on the combined information written as a unified XQuery and/or XPath.

A further embodiment provides a user with a form for entering semantic queries as a standard declarative SQL or equivalent query, and provides automatic transformation of the user-entered query into the XQuery, XPath and/or XMLExists query, or equivalent.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a schematic illustration of three tables, related by column ID, having instance data;

FIG. 6 is a schema diagram illustrating an example semantic query, having declarative form, having an ontology table function, and an example translation to a standard SQL/XML query;

DETAILED DESCRIPTION OF A PREFERRED EMBODIMENT OF THE INVENTION

Figure 1:
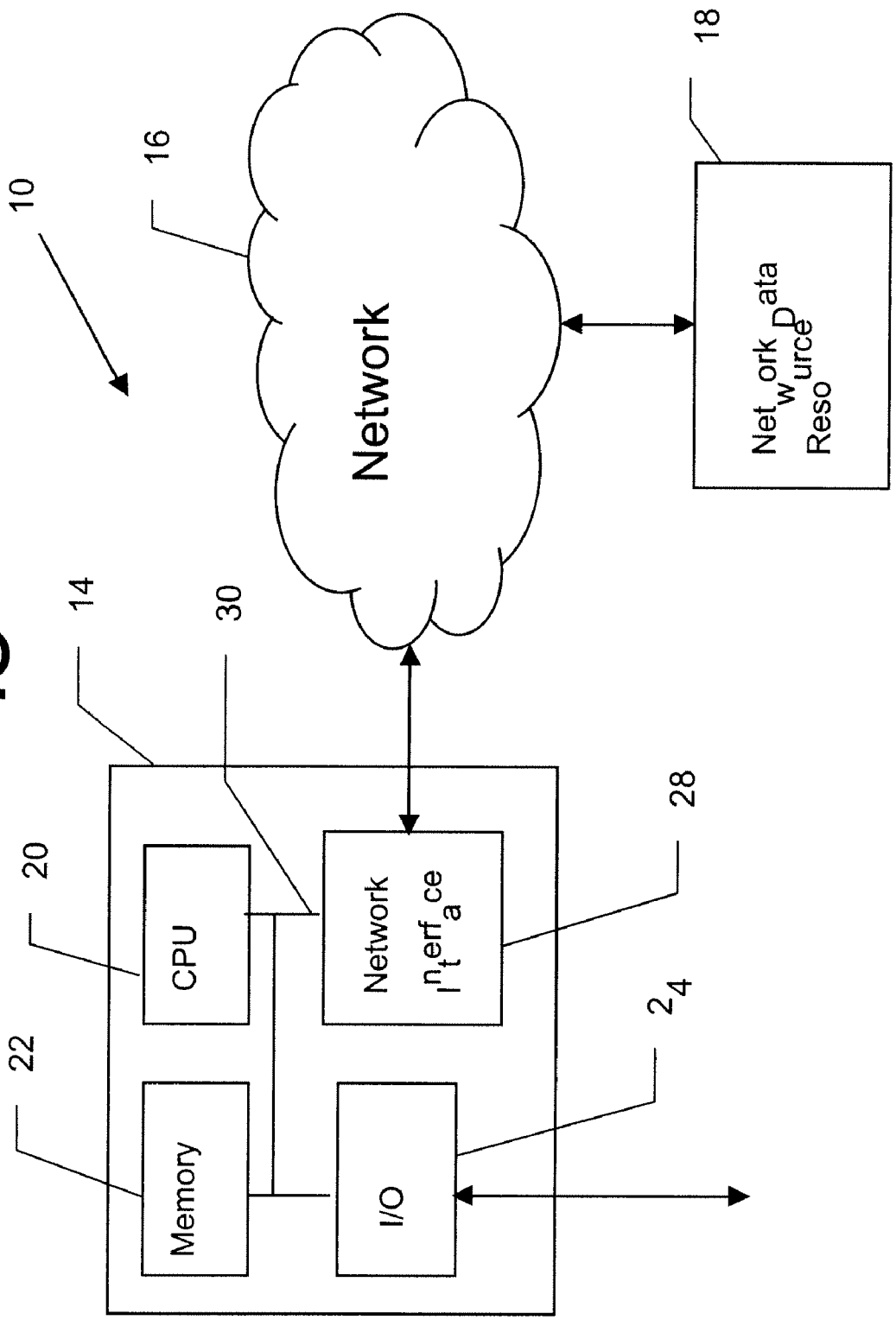
FIG. 1 is a schematic diagram illustrates one example operating environment.

The detailed description of specific examples of embodiments are in reference to example drawings that illustrate and describe examples in a detail enabling persons of ordinary skill in the arts to practice the invention. The specific examples are presented for illustration, and are not limiting.

As will be understood by persons skilled in the art upon reading this description, certain well-known techniques and methods are omitted, or are not described in detail, to avoid obscuring the novel features and aspects of the present invention.

The terminology used herein is not limiting and, instead, is only for purposes of ease of reference.

The functions and operations shown or described as separate blocks are generally shown or described as separate to clearly illustrate features and functions and are not, unless otherwise specified or clear from the context, necessarily performed at separate times, or on separate computational units.

The examples herein are described in reference to ontologies encoded using the OWL Web Ontology Language. OWL is a semantic markup language for publishing and sharing ontologies on the World Wide Web (WWW). OWL is only one example, and is it used for this description because it is a well-known ontology specification, has a well-established knowledge base, and various software implementations are commercially available from numerous vendors. OWL is developed as a vocabulary extension of RDF (the Resource Description Framework). The World Wide Web Consortium (W3C) provides the specification for OWL. As known to persons of ordinary skill in the art, and OWL ontology is composed of a set of RDF tuples or statements. For purposes of this description, an OWL file may be viewed a set of RDF statements, where each statement denotes a relationship between two terms.

Overview of Some Example Embodiments

One exemplary embodiment includes an environment such as that illustrated and described in further detail running, for example, an SQL/XML DBMS having XML native support. One example of such a DBMS is International Business Machines (IBM) Corp.'s DB2 Universal Database (UDB). IBM's DB2 UDB is only one example. Various other commercial SQL/XML DBMSs suitable as an environment for this invention are available from other commercial vendors including, for example, Oracle and Microsoft.

One exemplary embodiment further assumes a given SQL/XML relational database, which may be related tables, installed in or running under the SQL/XML DBMS. As an illustrative example, the given SQL/XML database may have information regarding, for example, the name, line of business, and various locations for each of a number of business entities.

One exemplary embodiment assumes a given ontology having additional information pertaining, in some specified or known manner, to information in the given SQL/XML table database. Selecting and implementing ontologies is known in the arts and, therefore, detailed description is generally omitted.

One exemplary embodiment includes extracting and storing the transitive/subsumption relationships from the given ontology data in a DBMS with native XML support. These transitive/subsumption relationships are transformed into a set of XML documents or tables that are natural mappings of the hierarchical structure of the transitive relationships.

The user can, optionally, practice an aspect of the invention upon the extraction and storage of the transitive relationships from the ontology. In one embodiment these are extracted and stored in, SQL/XML form, in the same SQL/XML DBMS (having native XML support) as the originally provided SQL/XML relational database. One embodiment provides for the user to search the aggregate information, using SQL/XML queries such as, for example, XPath, XQuery, and XMLExists. If the query is well written then, in terms of processing efficiency and an ability to readily update the database, this is a significant advance over prior art methods. However, writing such queries may be cumbersome.

One example embodiment therefore even further advances over the related art by providing the user a simple query form and, upon receiving the query, automatically translates it to a well-formed query employing search operators such as, for example, XPath, XQuery, and XMLExists. The translation may be transparent to the user. One embodiment provides an ontology table function for the user to express semantic matching queries in a simple, declarative manner, preferably conforming to conventional SQL table queries such as, for example, SELECT and WHEN. One example embodiment receives the user-entered declarative semantic matching queries and, applying defined transformation rules, automatically transforms or rewrites these into SQL/XML queries having, for example, XPath, XQuery and XMLExists. Typically, these SQL/XML queries are supported by the DBMS storing the given SQL/XML relational database of tables and the extracted and stored, in XML form, transitive relationships from the ontology. One example embodiment runs the XML/XPath and/or XML/XQuery generated by the translation or rewrite query as a combined query of the relation database and the extracted ontology information and provide the user with the search result.

One Example System and Environment

FIG. 1 illustrates one example system environment 10 for implementing at least one embodiment of the present invention. The example environment 10 comprises a machine processing resource 14 connected by a network 16 to a network data resource 18. The illustrated machine processing resource includes a central processing unit (CPU) 20, a memory 22, an input/output interface 24, and a network interface 28 for connecting to the network 16, interconnected by a data bus 30. The I/O interface 24 supports communication with a variety of storage and I/O devices such as, for example user terminals. The I/O interface 24 may include, for example, a keyboard and/or graphical user interface.

Network interface 30 supports a connection to external network 16 for communication with one or more other digital devices, systems or other networks. Network 16 may be any of the various local or wide area networks, including the Internet, known in the art of DBMS and ontology. Network resource block 18 represents all information storage accessible by the machine processing resource 14 through the network 16.

The blocks of FIG. 1 are each shown as a single block only for purposes of illustrating a particular function, or kind or category of functions. For example, the CPU 20 may be a single microprocessor, multiple CPUs, or any other computational resource to perform operations in accordance with machine-readable instructions. Memory 22 may be a component of the CPU 20 or it may be, for example, a distributed memory resource.

Alternatively, the described operations may be performed by specific hardware components that contain hardwired logic for performing the steps, or by any combination of programmed computer components and custom hardware components. Further, the described operations may be performed in distributed computing systems or environments, such as processors and processing components remote from a machine-readable medium, where instructions from the medium are communicated over a communication link or network.

Given SQL/XML Relational Databases

Related Tables

One example embodiment is described in reference to an illustrative example application, which is a given SQL/XML (or equivalent) relational database of tables, related to one another by an identification number as a primary key, having company names, the name of the companies' respective chief executive officer (CEO), the number of its employees, its business area, and its location. This example is only for illustrative purposes, and does not define any limitation as to which hierarchical database can be used, with respect to domain, complexity (e.g., number of columns), or specific format.

FIG. 2 shows an example SQL/XML multiple table relational database 200 storing the illustrative example of companies and company-related information. Referring to the FIG. 2 example, the information is stored in three tables; table 210, labeled 210 labeled "Company" that stores the name of the company, the name of the chief executive officer (CEO), and the number of employees; a table 220, labeled HasBusiness, that stores the companies' respective business area, and a table 230, labeled HasBranch, that stores where a company is headquartered. The tables 210, 220 and 230 are related by their respective "ID" column, which is a primary key method well known in the SQL/XML art.

With continuing reference to FIG. 2, it is seen that this example SQL/XML database 200 does not have geographical information as to which continent contains the cities in which the companies' branches are located. Therefore, a query for all companies having headquarters in Europe would be a semantic query, because that query cannot be answered using the database table 200 alone without knowledge of geographical locations. In other words, if a person of ordinary skill in the art, in the absence of the present invention, wrote the following standard-form SQL query:

```
SELECT C.Name
FROM Company AS C, HasBranch AS L
WHERE C.ID=L.ID AND L.location= 'Europe';
``` and ran this query against the FIG. 2 relational database table 210 Company and 230 HasBranch, it would of course fail— because the HasBranch table 230 does not have the semantic of location sufficient to identify "Munich" as being in Europe."

The present invention solves this problem, and provides other benefits, by combining under the SQL/XML DBMS having the original SQL/XML database additional information that it extracts and stores, using novel features that are described, in an SQL/XML or equivalent form readily native under and thus readily searchable by the SQL/XML DBMS, as described in further detail.

Identify or Construct an Ontology having the Required Semantic Information

To provide for semantic queries for information that is not contained in, or cannot be searched in the given SQL/XML table database, an ontology having such information must first be provided, or constructed. Details of obtaining, selecting and/or constructing such an ontology, to the extent it has the required information—regardless of being not native under an SQL/XML DBMS are domain—are known in the art and, therefore, are omitted.

Referring to the example SQL/XML relational database of FIG. 2, an example information that it lacks is geographical information as to which continents contain the cities appearing in the HasBranch table 230. According to one embodiment, a user identifies or constructs an ontology having that information. Further to the FIG. 2 example of companies and cities, an example ontology to construct or provide would have geographical information as to continents and cities. An illustrative example may be an ontology based on, or relating to, a world atlas such as, or example, the Rand-McNally® World Atlas.

Figure 3:
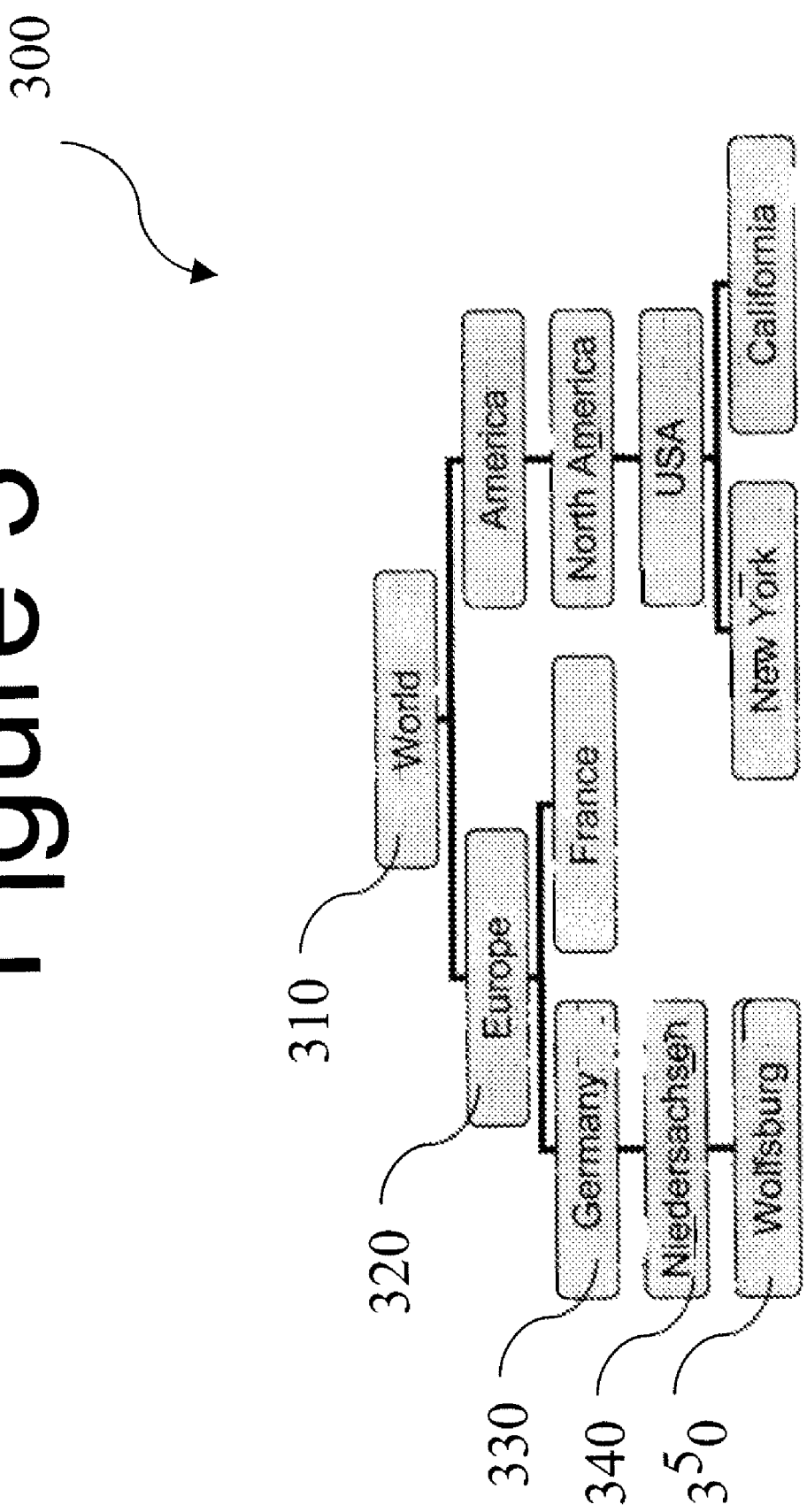
FIG. 3 is a schema diagram illustrating an example hierarchical relation extracted from example transitive relationships in an example ontology.

Preferably, the ontology is constructed or provided to have the information in a schema representing or reflecting hierarchical or subsumption relationships. FIG. 3 shows, diagramed in a conceptual form, an illustrative example of such hierarchical geographical information. The FIG. 3 example shows example cities of the world, each city's relation to a next higher geographical region, that region's relation to its next higher region, and so forth.

Extract and Store Ontology Data as Tables in the Same DBMS with Native XML Support that Stores the Subject Relational Database Instances FIG. 3 illustrates one example of an hierarchy of transitive and subsumption relationships to be extracted from an ontology having the information needed to answer a semantic query, i.e., a query for information not answerable from only the original given SQL/XML relational database such as, for example, database 200. Referring to FIG. 3, the example shows a small set of example geographical regions; e.g., Wolfsburg 350 is located inside Niedersachsen 340 which is located inside Germany 330 which is located inside Europe 320 which is located inside World 310. This is only an example, as an ontology having a domain including, for example, a world atlas would of course have a much more complex and a much larger number of instances and relationships.

With continuing reference to FIG. 3, the illustrated example relationships include subsumption, e.g., the World 310 subsumes all other nodes, and Germany 330 subsumes Niedersachsen 340 and Wolfsburg 350, and neighbor relationships, e.g., Germany 330 is a neighbor to France 360. The FIG. 3 illustrative example shows example transitive relationships, such as for example: Niedersachsen 340 subsumes Wolfsburg 350, while Germany 330 subsumes Niedersachsen 340 and, therefore, Germany 330 subsumes Wolfsburg 350.

This description defines "transitive" according to its ordinary and customary meaning in the art which includes, but is not limited to: a binary relation R is said to be transitive if the following condition is satisfied: if R(A,B) and R(B,C) are true, then R(A,C) is true. As known to persons skilled in the arts, OWL characterizes transitive relationships and non-transitive relationships. The present inventors have identified that these relationships can be extracted from an ontology (e.g., in OWL or an equivalent language), and stored under the same SQL/XML DBMS that stores the given SQL/XML table form of a relational database.

Figure 4:
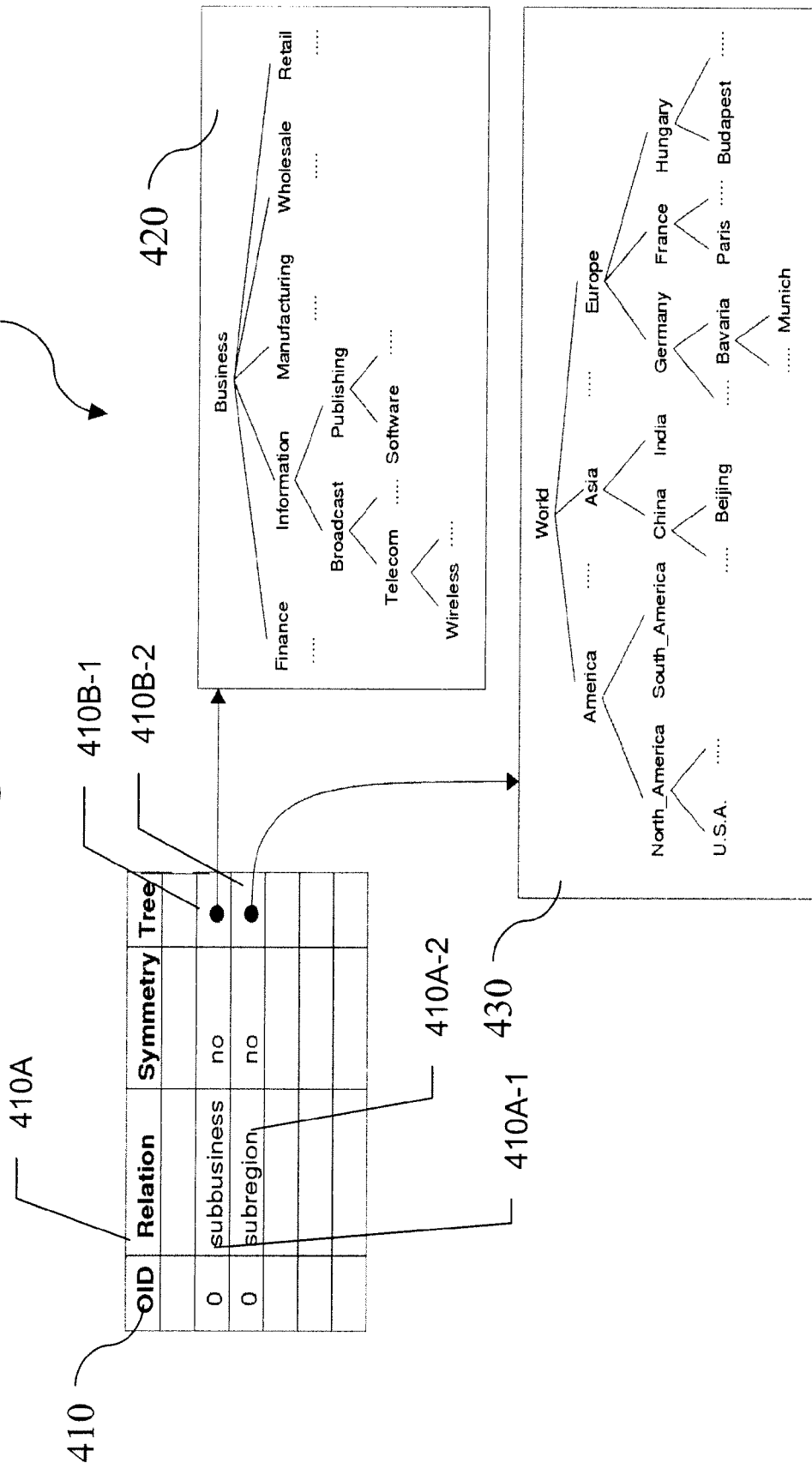
FIG. 4 is a schema diagram illustrating an example table storing example hierarchical relations from an example ontology, with example related tables of instances of the example hierarchical relation.

FIG. 4 is a diagram showing an illustrative example schema 400 for extracting relationships from an ontology and storing these under the SQL/XML DBMS supporting native XML. The FIG. 4 illustrative example assumes, for that example, specific transitive hierarchical relationships found in, and extracted from, an ontology having that pertains to the FIG. 2 example relational database 200 of companies, their CEO's, business areas, geographical locations and so forth.

Referring to FIG. 4, the illustrative example extraction and storage schema 400 has an ontology table 410, with "Relation" column 410A and "Tree" column 410B. The specific example row entries in the "Relation" column 410A are "subbusiness" and "subregion," labeled 410A-1 and 410A-2, respectively. Each row of the "Tree" column 410B contains a pointer or equivalent reference, with examples labeled 410B-1 and 410B-2. The "Tree" 410B entries point to, or reference, a specific tuple storing all instances of the relation (identified by column 410A) extracted from the ontology.

Figure 5:
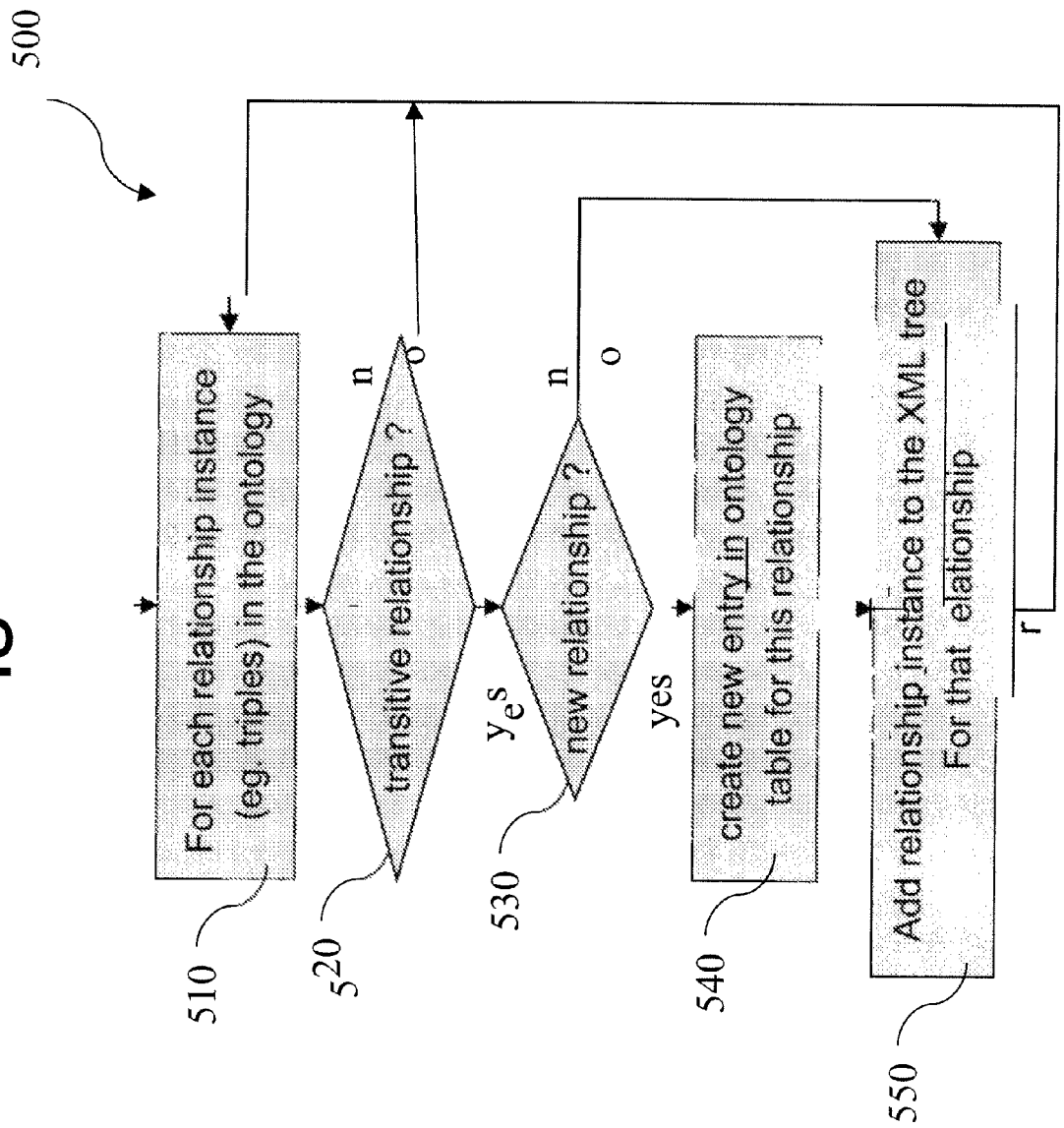
FIG. 5 is an example flow diagram of an example processing flow for extracting and storing hierarchical relations and instances in a native XML column form.

The ontology table 410 in the example schema 400 provides a generally more practical extraction and storage of relations from an ontology, for use with the described embodiments. For example, a table (not shown) may be used to store all pairs of (A,B) simply if the relation exists between A and B. However, if the relation between A and B is transitive and there is a relationship (B,C), the table would have to store as pairs (A,C). The result may be an overly large number of such pairs to store. Therefore, in a preferred embodiment, the transitive relationships are extracted and stored in an ontology table such as FIG. 4 table 410, by a process that may be characterized by an SQL/XML instruction of: CREATE table ontology (OID, Relation chart, symmetry chart, tree XML). Table 410 is an example of the resulting table. FIG. 5, referenced in more detailed description below, is a process flow diagram of an example for creating the table 410, and the tuples 420 and 430.

With continuing reference to FIG. 4, the example "Tree" entry 410B-1 points to tuple 420. Tuple 420 is an SQL/XML table, corresponding to the "subbusiness" relation identified by entry 410A-1, storing in XML form all "subbusiness" relations extracted from the ontology. Likewise, tuple 430 is an SQL/XML table, corresponding to the "subregion" relation identified by entry 410A-2, storing in XML form all "subregion" relations extracted from the ontology.

The FIG. 4 examples of tuples, in terms of the number of tuples and their respective informational topic, are only examples picked to correspond to the informational topics contained in the FIG. 2 example database 200. For example, referring to FIGS. 2 and 4, tuple 420 has a root element of "Business" and child elements, e.g., "Finance", "Information" and "Publishing." This information in tuple 420 supplements the business area names in the FIG. 2 example HasBusiness table 220. Likewise, the FIG. 4 example tuple 430, with a root element of "World," and child elements representing an hierarchical relationships as to geography, is further to and supplements the location names in the FIG. 2 example HasBranch table 230.

FIG. 5 is a process flow diagram illustrating one example process 500 for extracting the transitive relationships in an ontology and storing these, in SQL/XML form, in the same SQL/XML DBMSs having native XML in which the originally provided SQL/XML relational database of tables, e.g., the example database 200 of FIG. 2, is stored.

Referring to FIG. 5, the illustrated example 500 begins at step 510, which is the beginning of a processing loop that iterates through each instance of a relationship represented in the ontology. Upon step 510 identifying an instance, the process goes to step 520, which determines whether or not the relationship instance being processed is a transitive relationship. This determination is readily performed because, as known in the general ontology arts, a relationship will be specified as transitive or not transitive in the ontology. For example, the industry standard ontology language OWL specifies this.

With continuing reference to FIG. 5, if decision step 520 determines that the relationship is not transitive, i.e., if decision 520 is "NO," the process loops back to step 510 and picks the next relationship in the ontology. If the decision 520 is "YES," the process goes decision block 530 to determine whether the relationship instance being processed is a new relationship. If decision 530 is "NO," i.e., the relationship instance is not new, the next step 540 is skipped, and the process goes to step 550. If decision 530 is "YES, i.e., the relationship is new, the process goes to in step 540, a new entry in the ontology table is created for the relationship instance being processed. Then, in step 550, the relationship instance is added to the XML tree for that relationship. The process then loops back to step 520 to process the next relationship instance, and this continues until all relationship instances have been processed.

Writing and Applying XPath, XQuery and XMLExists Queries on Collective Database Under SQL/XML DBMS Supporting Native XML Referring to FIGS. 2-4, upon completion of the extraction and storage of transitive relations from the ontology using, for example, the process of FIG. 5, the SQL/XML DBMS with native XML provides an aggregate database, namely the given SQL/XML relational database of tables, e.g., the FIG. 2 database 200, and the XML files storing the relationships extracted from the ontology, e.g., the FIG. 4 SQL/XML table 410 and tuples 420, 430 of the example schema 400.

The user can then, according to one embodiment, search the now provided aggregate database using, for example, SQL/XML queries such as, for example, XPath, XQuery, and XMLExists. If the query is well written then in terms of, for example, processing efficiency, this is a significant advance over prior art methods. An illustrative example of a query according to the one embodiment is as follows:

```
SELECT C.Name
FROM HasBranch AS L, Ontology AS O, Company AS C
WHERE xmlexists(
    $t/Europe//*[fn:string(node-name(.))=$r]'
    Passing by ref O.tree AS 't", B.location AS "r")
AND O.OID=0 AND O.relation= 'subregion'
AND C.ID=L.ID;
```

As readily seen, using the SQL table alias operator "AS", the above query is a combined search on the HasBranch table 230, the ontology table 410 and the Company table 210, for instances where a city is both in the HasBranch table 230 and, in the SQL/XML tuple 430 (that tuple being in, or referenced by the "Tree" entry 410B-2 of the ontology table 410) is in a subsumption relationship with "Europe." Therefore, referring to one specific example query problem identified in the Background of this description, a user can write a semantic query of all companies having branches in Europe—a query that could not be answered using the database 200 alone.

The inventors have identified that writing XPath, XQuery and XMLExists as, for example, illustrated above may be time-consuming, cumbersome and not preferable by a user. One embodiment therefore even further advances over the related art by providing the user a simple semantic query form and, upon receiving the query, automatically translates it to a well-formed query employing search operators such as, for example, XPath, XQuery, and XMLExists.

Processing Semantic Query by Receiving a Simple table Function of Form Semantic Query from a User, and Automatically Translating the Table Form to a Combined Query on the Aggregate Database under SQL/XML DBMS A further embodiment provides a table function for a user to enter semantic searches on all, or selected parts of the aggregate database, that do not require the user to write the queries using complex SQL/XML operators such as for example, XPath, XQuery, and XMLExists. The table function is generally referenced herein as the "ontology table function." The ontology table function preferably conforms to standard SQL queries such as, for example, SELECT and WHERE. Preferably the conformance is such that queries may be written using standard SQL search operators, such as SELECT and WHERE, for searches that include the SQL/XML extraction and storage of the ontology, e.g., the FIG. 4 schema 400.

According to one embodiment, an example ontology table function has a general form of ONTOLOGY(OID, RName, Term), where "ONTOLOGY" is an example label instructing the SQL/XML DBMS to invoke or perform a query rewrite or translation into XPath, XQuery and/or XMLExists, as will described in greater detail below. The OID field identifies which ontology table, e.g., ontology table 410 from the schema 400, in the SQL/XML DBMS. The "RName" field identifies, in this example, a relation in the "Relation" column 410A of table 410. Referring to FIG. 4, the row of table 410 having a "Relation" column value equal to the "RName" value has a "Tree" 410B that contains or points to, the tuple, e.g., 420 or 430, storing instances of that relation.

The described ontology table function such as, for example, ONTOLOGY(OID, RName, Term), provides for semantic queries to be expressed as a standard SQL table query. This ontology table function hides the complex SQL/XML constructs and, being declarative, it exposes more query optimization opportunities.

As described in further detail below, one or more embodiments provide automatic query rewrite of these described and other ontology table functions into, for example, standard SQL/XML search operators such as, for example, XPath, XQuery and XMLExists, or their equivalents.

One illustrative example of the ontology table function providing a user with an example standard SQL query, under the SQL/XML DBMS, of its XML storage of the extracted ontology and of the given SQL relational database is the following which, upon translation as described in further detail, instructs the SQL/XML DBMS to perform the same combined query as that requested by the above-described example using XMLExists:

```
SELECT C.Name
FROM HasBranch AS L,
    Ontology(0, 'subregion', 'Europe') AS O,
    Company AS C
WHERE O.Term=L.Location AND C.ID=L.ID;
```

FIG. 6 is a diagram illustrating a translation of the above-described example query, having the ontology table function, labeled on FIG. 6 generally as 610, to the previously described SQL/XML query using XMLExists, labeled generally as 620.

Figure 7:
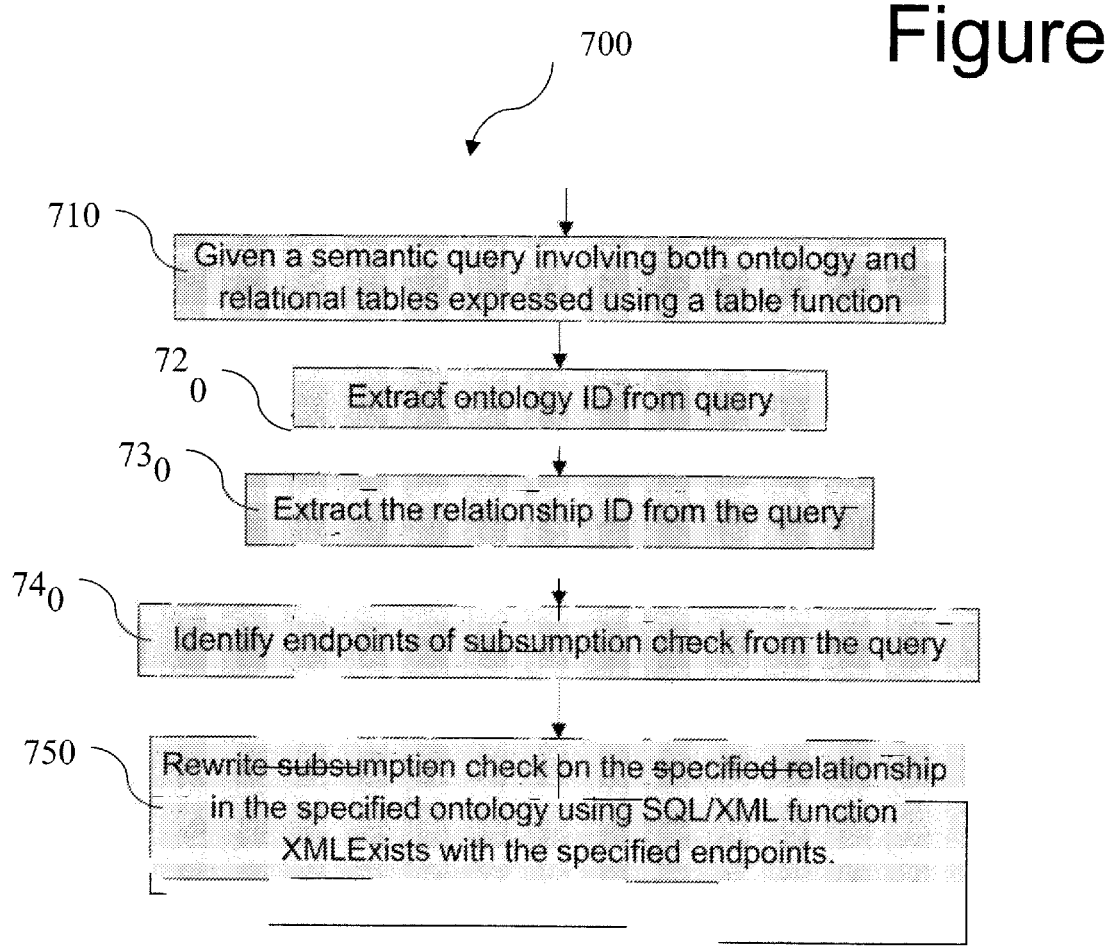
FIG. 7 is a flow diagram illustrating an example processing flow of a translation depicted by FIG. 6.

FIG. 7 is a flow diagram illustrating an example processing flow of a translation of a query, from standard SQL/XML form as augmented by the described ontology table function, to a standard SQL/XML query using XMLExists. FIG. 7 is shows one example flow diagram for translating a user-entered query having the ontology table function. Other processes will be apparent to persons skilled in the art upon reading his disclosure based on, for example, the particular SQL/XML form of the extracted ontology, e.g., various alternatives and extensions to the schema 400, the number of search terms, different SQL operators to run on the SQL/XML DBMA, and the particular SQL/XML DBMS, may be readily identified and implemented by persons skilled in the arts, in view of this disclosure.

Referring to FIG. 7, the process begins at 710 where the user-entered semantic query having the ontology table function is input. The query may, for example, be the previously described example of:

```
SELECT C.Name
FROM HasBranch AS L,
    Ontology(0, 'subregion', 'Europe') AS O,
    Company AS C
WHERE O.Term=L.Location AND C.ID=L.ID;
```

In step 720, the ontology ID is extracted from the query. An illustrative example operation, referring to the FIG. 6 specific example, of extraction 720 would extract the "0" entry 610A in the example's "Ontology" function field and insert it as the "O.OID.0" field 620A in the translation 620. Referring to FIG. 7, extraction 730 extracts the relationship ID indicated by the input query. An illustrative example operation of extraction 730, referring to the FIG. 6 specific example, would extract the "subregion" entry 610B of the example's "Ontology" function field (contained in query 610) and place it in the "subregion" field 620B in the translation 620.

With continuing reference to FIG. 7, at step 740 the end points of the subsumption test in the query are identified. Referring to the FIG. 6 specific example, an illustrative example operation of the end point identification 740 would identify "Europe" and "Location", 610C and 610C, respectively, in the user-entered semantic query 610, and insert these as the endpoints "$t//Europe//" and "B.location", respectively. Then, at step 750, the subsumption test is expressed using, for example, the SQL/XML function XMLExists based on the ontology ID, relationship ID and subsumption endpoints that have been previously extracted or identified at steps 720, 730 and 740. An illustrative example operation of the expression 750, applied to the FIG. 6 example query 610, generates the translated query 620.

Implementation of the Preferred Embodiment

Figure 8:
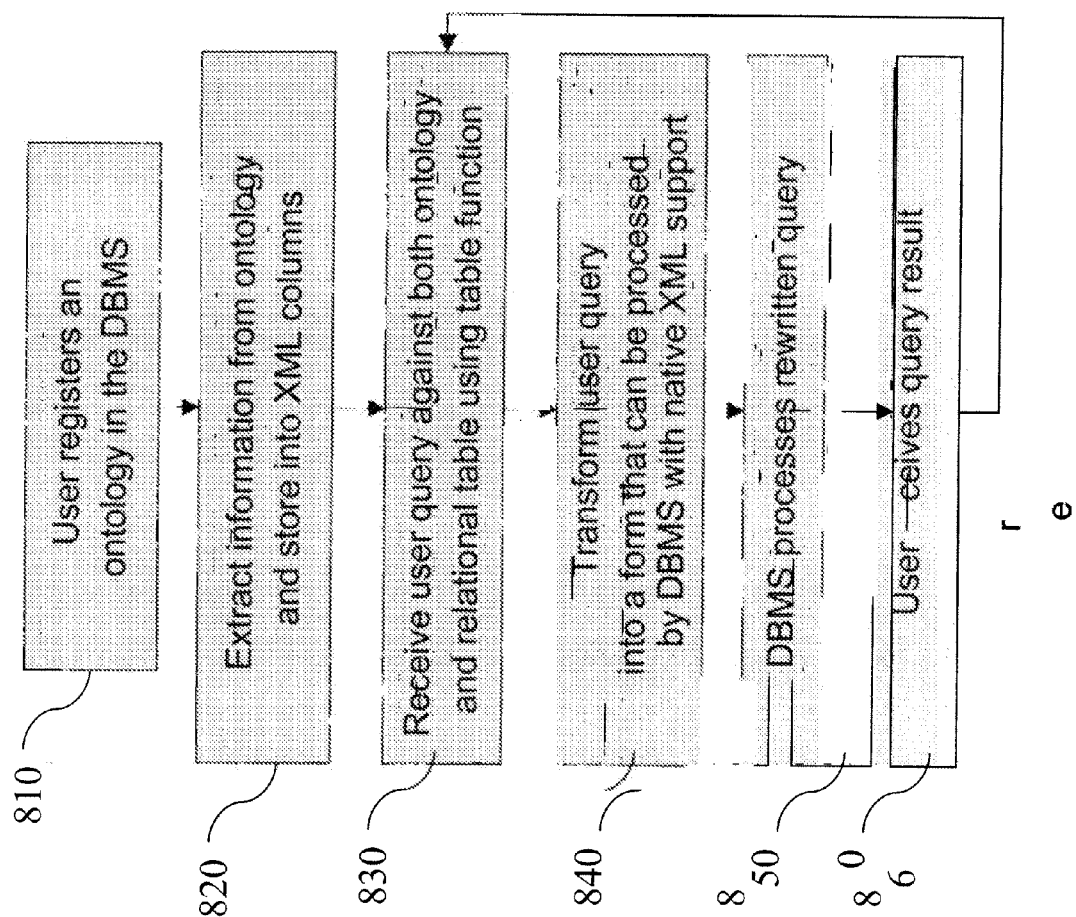
FIG. 8 is a flow diagram illustrating an example processing flow on one example embodiment.

Referring to FIG. 8, an example workflow of how a user may deploy or apply one exemplary embodiment of the present invention is illustrated. The exemplary embodiment includes an environment such as that illustrated and described in reference to FIG. 1, running, for example, an SQL/XML DBMS having XML native support such as, for example, International Business Machines (IBM) Corp.'s DB2 Universal Database (UDB) or an equivalent. The exemplary embodiment further includes a given SQL/XML relational database, which may be related tables, installed in or running under the SQL/XML DBMS, such as previously described.

The exemplary embodiment further assumes a given ontology having additional information pertaining, in some specified or known manner, to information in the given SQL/XML table database, such as previously described.

The FIG. 8 example workflow is on an embodiment providing the described ontology table function, for the user to input semantic queries as standard form SQL searches, such as the example semantic query 610 illustrated in FIG. 6. The embodiment further includes an automatic query translation feature such as, for example, that described in reference to FIGS. 6 and 7, that translates the semantic query into, for example XPath, XQuery and XMLExists operators supported by the SQL/XML DBMS.

Referring to FIG. 8, the deployment begins at step 810, where the user registers an ontology in the DBMS. Registering an ontology can be via registration commands or stored procedure, as known to persons skilled in the arts pertaining to this invention. Extraction and storage 820 extracts and stores the transitive relationships from the ontology, in XML form, as a relational database under the SQL/XML DBMS with native XML support. The extraction and storage may, for example, be according to that described in reference to the FIG. 5 example process 500. The schema of the SQL/XML storage of the extracted transitive relationships may, for example, be according to that described in reference to the FIG. 6 example schema 600.

With continuing reference to FIG. 8, after the extraction and storage 820, the SQL/XML DBMS contains or manages the original relational database, e.g., the relational database of SQL tables 200 illustrated by the FIG. 2 example, and the extracted transitive relationships of the ontology, having a schema such as the SQL/XML schema 400 of FIG. 4. At 830 the user enters a semantic query, in a standard SQL form augmented by the ontology table function described herein. The semantic query may, for example, be in accordance with the FIG. 6 example 610. Referring to FIG. 8, at 840 the user-entered query 830 is automatically transformed or rewritten into a form that can be executed by the DBMS with native XML support, as a combined query on the given relational database, e.g., database 200 of FIG. 2, and the extracted and stored transitive relationships from the ontology, e.g., the ontology table 410 and tuples 420, 430 of FIG. 4. Then, at 850, the re-written query is executed by the SQL/XML DBMS with native XML support and, at 860 provides the result to the user. The process then loops back to 830 to receive another semantic query from the user.

As described, the inventors have identified and exploited that both XML data and ontology data have a hierarchical data model, and that this makes possible storing ontology data and supporting ontology-related semantic queries in SQL/XML DBMSs by leveraging native XML support. As described, the embodiments are novel in providing for expression and processing of ontology-based queries as standard SQL/XML queries, e.g., SELECT and WHEN, without requiring user-defined functions or special operators. This allows such queries to take full advantage of query processing and optimization power of SQL/XML DBMSs and leads to significant performance and ease-of-use improvements over prior approaches. Further, according to the described method, inference on ontology data may be done at query time by taking full advantage of XPath and XQuery support. No pre-computation and materialization of transitive closures is needed, and the embodiment can process updates on ontology data efficiently.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for supporting semantic matching queries in a Structured Query Language/eXtensible Markup Language (SQL/XML) database management system (DBMS) with native XML support, having a given relational database, the computer performing steps comprising:

storing transitive relationships $R^T$ of a given ontology which is not in a native XML system as an ontology relational database in the DBMS, where a relation r is transitive if the relation r between elements A and B of the ontology in combination with the relation r between elements B and C of the ontology implies the relation r between elements A and C of the ontology, all such relations r of the ontology comprising a set R of transitive relationship instances where $R \in R^T$, wherein the transitive relationships $R^T$ of ontology data are stored as XML documents having table entries for each set of transitive relationships R, each being a tree mapping of hierarchical ontology data, each of the tree mappings being a specific tuple storing all instances of the corresponding transitive relation and being searchable in SQL/XML by using native XML support, without precomputed transitive closure tables that are rebuilt when the ontology is updated; and searching the combined given relational database and the ontology relational database using SQL/XML search operators supported by the DBMS.

2. The method according to claim 1, further comprising:
providing an ontology table function for expressing combined queries of the given relational database and the ontology relational database;
receiving semantic queries expressed according to the ontology table function; and
translating the received semantic queries into a search query having SQL/XML search operators supported by the DBMS.

3. The method according to claim 2, wherein the translating forms the search query of SQL SELECT and WHERE operators and of at least one XML search operator.

4. The method according to claim 3, wherein the XML search operator is at least one from the group consisting of (XPath, XQuery and XMLExists).

5. The method of claim 2, wherein the storing transitive relationships of a given ontology as an ontology relational database in the DBMS, includes
iteratively identifying each relationship instance in the ontology that is a transitive relationship and
if the transitive relationship is a new relationship, not identified by a previous iteration, then creating a new entry in an ontology table identifying the relationship, else add the relationship instance to an XML tree for that relationship.

6. The method of claim 1, wherein the searching uses a search query of SQL SELECT and WHERE operators and at least one XML search operator.

7. The method of claim 1, wherein the storing transitive relationships $R^i$ of a given ontology as an ontology relational database in the DBMS, includes
iteratively identifying each relationship instance in the ontology that is a transitive relationship and,
if the transitive relationship is a new relationship, not identified by a previous iteration, then creating a new entry in an ontology table identifying the relationship, else add the relationship instance to an XML tree for that relationship.

8. A computer implemented system for supporting semantic matching queries in Structured Query Language/eXtensible Markup Language (SQL/XML) database management system (DBMS) with native XML support, having a given relational database, the computer implemented components of the system comprising:
a machine-readable storage medium attached to a processor;
machine-readable program code, stored on the machine-readable storage medium and being operable on the processor, the machine-readable program code having:
instructions for storing transitive relationships $R^T$ of a given ontology which is not in a native XML system as an ontology relational database in the DBMS, where a relation r is transitive if the relation r between elements A and B of the ontology in combination with the relation r between elements B and C of the ontology implies the relation r between elements A and C of the ontology, all such relations r of the ontology comprising a set R of transitive relationship instances where $R \in R^T$, wherein the transitive relationships $R^T$ of ontology data are stored as XML documents having table entries for each set of transitive relationships R, each being a tree mapping of hierarchical ontology data, each of the tree mappings being a specific tuple storing all instances of the corresponding transitive relation and being searchable in SQL/XML by using native XML support, without precomputed transitive closure tables that are rebuilt when the ontology is updated; and
instruction for searching the combined given relational database and the ontology relational database using SQL/XML search operators supported by the DBMS.

9. The system of claim 8, wherein the machine-readable program code further includes:
instructions for providing an ontology table function for expressing combined queries of the given relational database and the ontology relational database;
instructions for receiving semantic queries expressed according to the ontology table function; and
instructions for translating the received semantic queries into a search query having SQL/XML search operators supported by the DBMS.

10. The system of claim 9, wherein the machine-readable program code instructions for the translating instructs the translating to form the search query of SQL SELECT and WHERE operators and of at least one XML search operator.

11. The system of claim 10, wherein the machine-readable program code instructions for the translating instructs the translating to form the XML search operator to be at least one from the group consisting of (XPath, XQuery and XMLExists).

12. The system of claim 9, wherein the machine-readable program code instructions for storing transitive relationships of a given ontology as an ontology relational database in the DBMS, include:
instructions for iteratively identifying each relationship instance in the ontology that is a transitive relationship and,
if the transitive relationship is a new relationship, not identified by a previous iteration, then creating a new entry in an ontology table identifying the relationship, else add the relationship instance to an XML tree for that relationship.

13. The system of claim 8, wherein the machine-readable program code instructions for the translating instructs the translating to form the search query of SQL SELECT and WHERE operators and of at least one XML search operator.

14. The system of claim 8, wherein the machine-readable program code instructions for storing transitive relationships of a given ontology as an ontology relational database in the DBMS, include:
instructions for iteratively identifying each relationship instance in the ontology that is a transitive relationship and,
if the transitive relationship is a new relationship, not identified by a previous iteration, then creating a new entry in an ontology table identifying the relationship, else add the relationship instance to an XML tree for that relationship.

* * * * *